United States Patent
Tarchala et al.

(10) Patent No.: US 11,188,925 B1
(45) Date of Patent: Nov. 30, 2021

(54) METHOD AND SYSTEM FOR AUTOMATED RECONFIGURATION OF USER INTERFACE BASED ON PRODUCT LIFECYCLE

(71) Applicant: Honda Motor Co., Ltd., Tokyo (JP)

(72) Inventors: Christopher Tarchala, Torrance, CA (US); Hanna Gee, Torrance, CA (US); Megan Colleen Sundquist, Grand Rapids, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/216,913

(22) Filed: Mar. 30, 2021

(51) Int. Cl.
*G06F 3/0482* (2013.01)
*G06Q 30/00* (2012.01)
*G06T 11/00* (2006.01)
*G06F 3/0484* (2013.01)

(52) U.S. Cl.
CPC ....... *G06Q 30/018* (2013.01); *G06F 3/04842* (2013.01); *G06T 11/001* (2013.01); *G06T 2200/24* (2013.01)

(58) Field of Classification Search
CPC .................................................... G06F 3/0482
USPC .......................................................... 715/744
See application file for complete search history.

(56) References Cited

U.S. PATENT DOCUMENTS

| | | | | |
|---|---|---|---|---|
| 8,818,874 | B2 * | 8/2014 | Veseli | G06Q 20/203 705/21 |
| 9,372,922 | B2 * | 6/2016 | Shaashua | G06F 16/35 |
| 9,641,553 | B2 * | 5/2017 | Ellis | H04L 63/20 |
| 9,741,244 | B2 * | 8/2017 | Berelejis | G08C 23/02 |
| 9,841,968 | B1 * | 12/2017 | Riedl | G06F 3/002 |
| 9,871,865 | B2 * | 1/2018 | Shaashua | H04L 12/2818 |
| 10,064,062 | B2 * | 8/2018 | Idnani | H04W 60/00 |
| 10,079,691 | B2 * | 9/2018 | Christopher | H04L 12/66 |
| 10,389,863 | B2 * | 8/2019 | Jeon | G06F 3/0482 |
| 10,555,176 | B2 | 2/2020 | Idnani et al. | |
| 10,637,870 | B2 * | 4/2020 | Do | H04W 12/084 |
| 10,755,061 | B1 * | 8/2020 | Monroy-Hernandez | G06K 7/1413 |
| 10,776,080 | B2 * | 9/2020 | Britt | H04L 67/303 |
| 10,834,586 | B2 * | 11/2020 | Christopher | H04L 69/18 |
| 2002/0128851 | A1 * | 9/2002 | Chefalas | G06Q 10/10 705/302 |
| 2003/0014267 | A1 * | 1/2003 | Culp | G07G 1/0036 705/23 |

(Continued)

FOREIGN PATENT DOCUMENTS

| | | |
|---|---|---|
| KR | 102087926 B1 | 5/2020 |
| WO | 2016201915 A1 | 12/2016 |
| WO | 2017205770 A1 | 11/2017 |

*Primary Examiner* — Reza Nabi
(74) *Attorney, Agent, or Firm* — Plumsea Law Group, LLC (57) ABSTRACT

A system and method for automatically reconfiguring a user interface based on a product lifecycle that changes a visual appearance of a product image in the user interface to reflect its age or ownership duration is described. In one embodiment, a method includes determining one or more products owned by a user and an ownership period associated with an age or ownership duration of each product. The ownership period is compared to a product lifecycle for the product and, based on the comparison, one or more temporal effects are overlaid onto a base product image for the product. The one or more temporal effects change a visual appearance of the base product image in a user interface on a user device in communication with the unified product application to reflect the age or ownership duration of the product.

13 Claims, 8 Drawing Sheets

(56) References Cited

U.S. PATENT DOCUMENTS

| | | | | |
|---|---|---|---|---|
| 2003/0149573 A1* | 8/2003 | Lynton | ........... | G06Q 30/02 |
| | | | | 705/302 |
| 2007/0255575 A1* | 11/2007 | Buchheit | ........... | G06Q 30/012 |
| | | | | 705/1.1 |
| 2009/0187597 A1* | 7/2009 | Kamada | ........... | G06Q 30/02 |
| 2011/0238590 A1* | 9/2011 | Engestrom | ........... | G06Q 10/10 |
| | | | | 705/318 |
| 2013/0041774 A1* | 2/2013 | Emura | ........... | G06Q 30/0251 |
| | | | | 705/26.7 |
| 2013/0080251 A1* | 3/2013 | Dempski | ........... | G06Q 30/01 |
| | | | | 705/14.53 |
| 2013/0212039 A1* | 8/2013 | Burckart | ........... | G06Q 30/02 |
| | | | | 705/347 |
| 2013/0227653 A1* | 8/2013 | Choi | ........... | H04L 63/10 |
| | | | | 726/4 |
| 2016/0071189 A1* | 3/2016 | Sakurai | ........... | G06Q 10/087 |
| | | | | 705/26.81 |
| 2016/0196052 A1* | 7/2016 | Franklin | ........... | G06F 3/04845 |
| | | | | 715/765 |
| 2018/0206083 A1* | 7/2018 | Kumar | ........... | H04W 4/025 |
| 2019/0202062 A1* | 7/2019 | Park | ........... | B25J 19/023 |
| 2019/0361575 A1* | 11/2019 | Ni | ........... | G06F 3/0484 |
| 2019/0392495 A1* | 12/2019 | Ohki | ........... | G06Q 30/0643 |
| 2020/0273042 A1* | 8/2020 | Wang | ........... | G06Q 20/18 |
| 2021/0042724 A1* | 2/2021 | Rathod | ........... | G06Q 30/06 |

\* cited by examiner

METHOD AND SYSTEM FOR AUTOMATED RECONFIGURATION OF USER INTERFACE BASED ON PRODUCT LIFECYCLE

BACKGROUND

The embodiments relate generally to methods and systems for automatically reconfiguring the visual appearance of a product presented to a user on a screen via a graphical user interface ("GUI") based on the product lifecycle.

Consumers may own multiple products, including products of different types and functions, that are produced and/or sold from the same company, parent company, or its divisions. For example, some consumers have brand loyalty that drives them to make multiple purchases from the same brand or family of brands. Other consumers may appreciate owning products that are part of the same "ecosystem" of products and services.

Such consumers may be able to use a single, unified user interface to conveniently access product information, additional products and/or accessories, product or user settings, and other services or information associated with products owned by the consumer and/or produced by the company or its divisions. Using such a unified interface provides one-stop access for the consumer for all products purchased or leased from the company or its divisions. However, it may be difficult for these consumers to easily gauge the age of their owned products without navigating through various menus and other settings.

There is a need in the art for a system and method that addresses the shortcomings discussed above.

SUMMARY

The exemplary embodiments described herein provide methods and systems for automated reconfiguration of a user interface based on a product lifecycle that changes a visual appearance of a product image in the user interface to reflect its age or ownership duration.

In one aspect, a method for automatically reconfiguring a user interface based on a product lifecycle is provided. The method includes determining, by a processor of a unified product application, one or more products owned by a user. The method also includes determining, for each product of the one or more products owned by the user, an ownership period associated with an age or ownership duration of the product. The ownership period is compared to a product lifecycle for the product and, based on the comparison of the ownership period to the product lifecycle, the method includes overlaying one or more temporal effects onto a base product image for the product. The one or more temporal effects change a visual appearance of the base product image in a user interface on a user device in communication with the unified product application to reflect the age or ownership duration of the product.

In another aspect, a method of automatically reconfiguring a user interface based on a product lifecycle is provided. The method includes receiving, from a user interface on a user device, a selection of a new product from a user to be added to one or more products owned by the user. The method also includes generating a new product image in the user interface on the user device for the new product. The new product image includes a base product image associated with the new product and one or more new effects added onto the base product image to visually indicate to the user that the new product is newly owned by the user.

In another aspect, a system for automatically reconfiguring a user interface based on a product lifecycle is provided. The system includes a processor and machine-readable media including instructions which, when executed by the processor, cause the processor to determine one or more products owned by a user and to determine, for each product of the one or more products owned by the user, an ownership period associated with an age or ownership duration of the product. The instructions further cause the processor to compare the ownership period to a product lifecycle for the product, and, based on the comparison of the ownership period to the product lifecycle, overlay one or more temporal effects onto a base product image for the product in the user interface. The one or more temporal effects change a visual appearance of the base product image in the user interface on a user device to reflect the age or ownership duration of the product.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The example embodiments described herein provide methods and systems for a unified product application ("app") configured to automatically reconfigure a user interface based on a product lifecycle that changes a visual appearance of a product image in the user interface to reflect its age or ownership duration. New or newer products have a visual appearance in the user interface that makes them appear shiny or glowing, whereas old or older products have a visual appearance that makes them appear dull or dirty. Through this mechanism, a user may quickly and easily visualize the duration or age of the products they own by accessing the unified product application through the user interface.

Throughout this disclosure, references to components or modules generally refer to items that logically can be grouped together to perform a function or group of related functions. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software.

Figure 1:
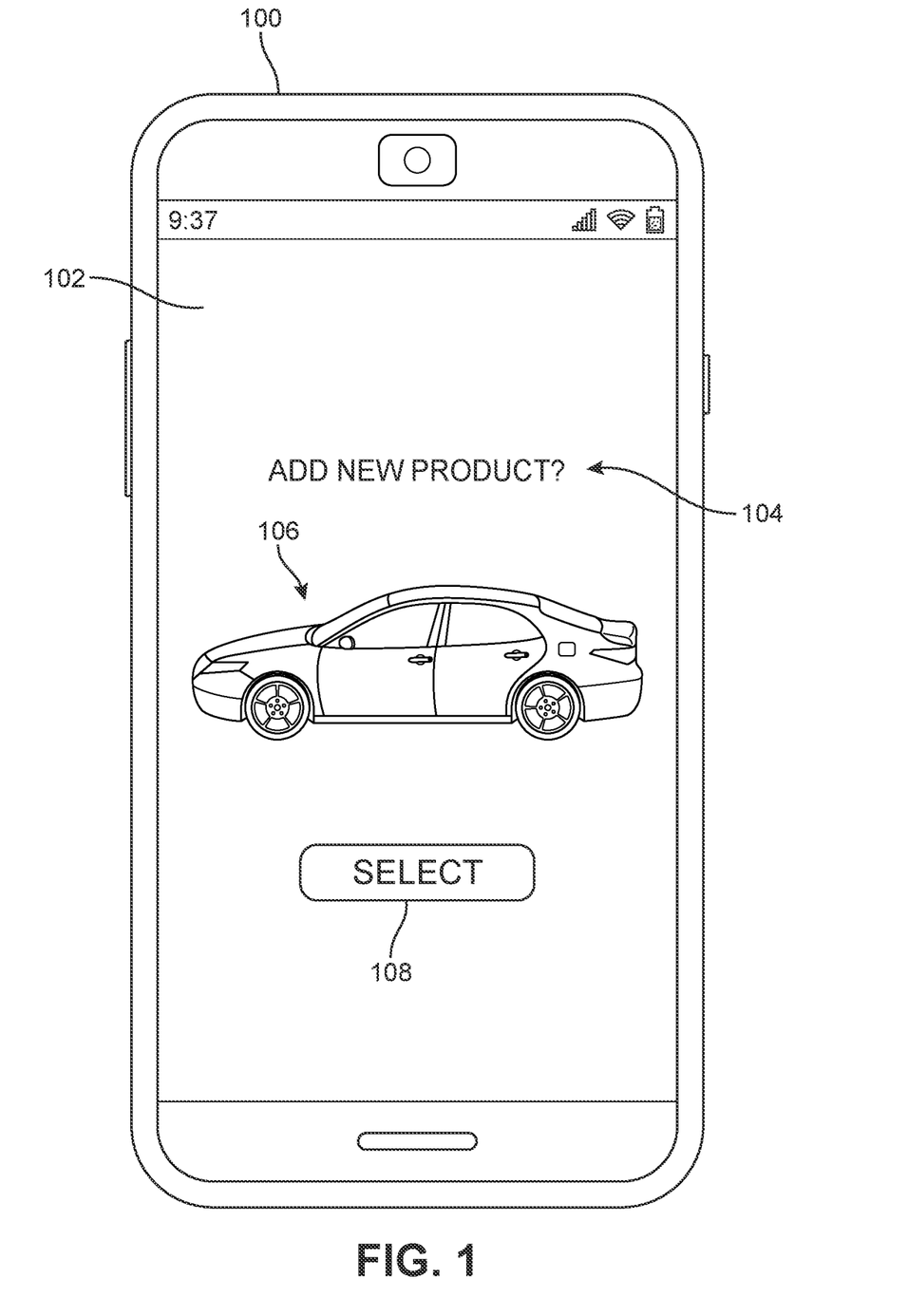
FIG. 1 is a representative view of an example embodiment of a user interface for adding a new product owned by a user.

Referring now to FIG. 1, an example embodiment of a user computing device 100 (also referred to herein as "user device") through which a user may access and interact with a unified product application is shown. In some embodiments, user device 100 may be a mobile computing device, such as a smartphone, tablet, or laptop computer. In other embodiments, user device 100 may be any other type of computing device, such as a desktop computer. As shown in FIG. 1, user device 100 is a smartphone that includes a user interface 102. According to the techniques described herein, user interface 102 will be automatically reconfigured based on a product lifecycle that changes a visual appearance of a product image in user interface 102 to reflect its age or ownership duration.

In this embodiment, user interface 102 of user device 100 is shown with a prompt 104 guiding a user to add a new product (e.g., prompt 104 "Add New Product?") to the user's account with a company. As described in more detail below with reference to FIG. 8, a new product owned by a user may be detected using various mechanisms. In the example embodiment shown in FIG. 1, the new product to be added to the user's account with the company is a new automobile, represented by a base product image 106 in user interface 102. The user may then select the new automobile represented by base product image 106 by interacting with a selection icon 108. Selection icon 108 may be selected using any type of input device, such as a mouse, keyboard, buttons, and/or through a touchscreen.

Once the user has confirmed the addition of the new product (e.g., the new automobile represented by base product image 106), the new product may be associated and/or saved in the user's account with a company. In some embodiments, the company, including its parent company or corporation, subsidiaries, and/or its divisions (collectively referred to herein simply as "company"), may sell, rent, and/or lease a variety of products of different types, and access to information or related products, accessories, and/or services, may be generally available to the user through a unified product application offered by the company and accessed via a user interface (e.g., user interface 102 on user device 100) of some type. In some embodiments, the user may also customize the appearance of their products through the unified product application, including, for example, paint colors, trim options, wheels, etc., so that base product image 106 shown in user interface 102 appears visually identical or similar to the actual product owned by the user in real life.

Figure 2:
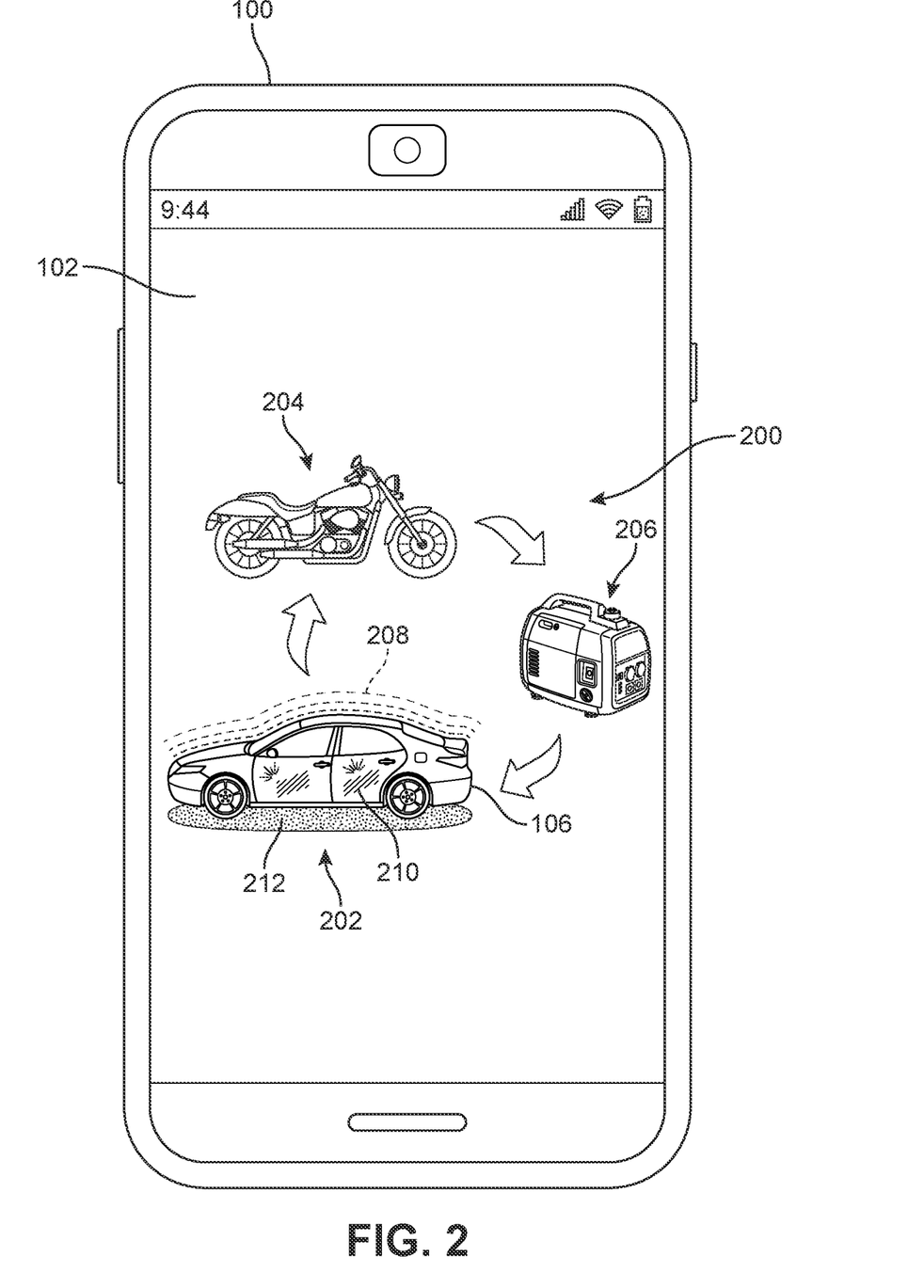
FIG. 2 is a representative view of an example embodiment of a new product visually represented on a user interface with one or more new effects added to a base product image.

Referring now to FIG. 2, user interface 102 on user device 100 is shown with a plurality of products 200 from the same company owned by the user. For the purposes of this disclosure, products "owned" by a user include products owned, rented, or leased by the user. In this embodiment, plurality of products 200 are arranged in a carousel that allows the user to rotate or swipe through the various products owned by the user. In accordance with the techniques described herein, a new product 202 (e.g., the new automobile added by the user as described in FIG. 1) is shown in user interface 102 on user device 100, as well as several other products owned by the user that are also from the same company, including a second product 204 (e.g., a motorcycle) and a third product 206 (e.g., a generator). In this example, three products of plurality of products 200 are shown in user interface 102 on user device 100, however, any number of products may be included in plurality of products 200.

It should be understood that a variety of different products of different types may be owned, leased, or rented by a user that are offered from the same company. For example, products may include, but are not limited to: automobiles (including cars, trucks, SUVs, vans, etc.), motorcycles, scooters, all-terrain vehicles, aircraft, watercraft, generators, and other types of vehicles, machines or machinery. In any case, all of the products from the same company owned, leased, or rented by the user may be visible to the user from the company's unified product application accessed by the user through user interface 102 on user device 100.

For purposes of illustration, an example of a real-world company is Honda®. The Honda Motor Company® is a multinational conglomerate corporation primarily known as a manufacturer of automobiles, motorcycles, aircraft, and power equipment provided through the several internal divisions and corporations, such as the American Honda Motor Company®, Honda Auto®, Honda Racing Corporation®, HondaJet®, Acura®, and other such divisions. In some embodiments, the proposed systems and methods can be used by owners of any Honda® product to view those products through a unified product application, allowing for quick access to the broad range of Honda products available to customers.

In an example embodiment, upon adding new product 202 to the user's account, user interface 102 is automatically reconfigured to change the visual appearance of base product image 106 of new product 202 in user interface 102 to reflect its age or ownership duration. In this case, new product 202 has one or more new effects added or overlaid onto base product image 106 to visually indicate to the user that new product 202 is newly owned by the user. For example, as shown in FIG. 2, base product image 106 (e.g., image of an automobile) has a number of new effects added or overlaid, including a glow effect 208, a shine effect 210, and a shadow effect 212, onto base product image 106. Each of the new effects (e.g., glow 208, shine 210, and shadow 212) act to emphasize or highlight the newness of new product 202 in user interface 102 as compared with the other products already owned by the user, such as second product 204 (e.g., a motorcycle) and/or third product 206 (e.g., a generator). With this arrangement, a user may conveniently and easily visualize the duration or age of the products they own by accessing the unified product application through user interface 102.

Figure 3:
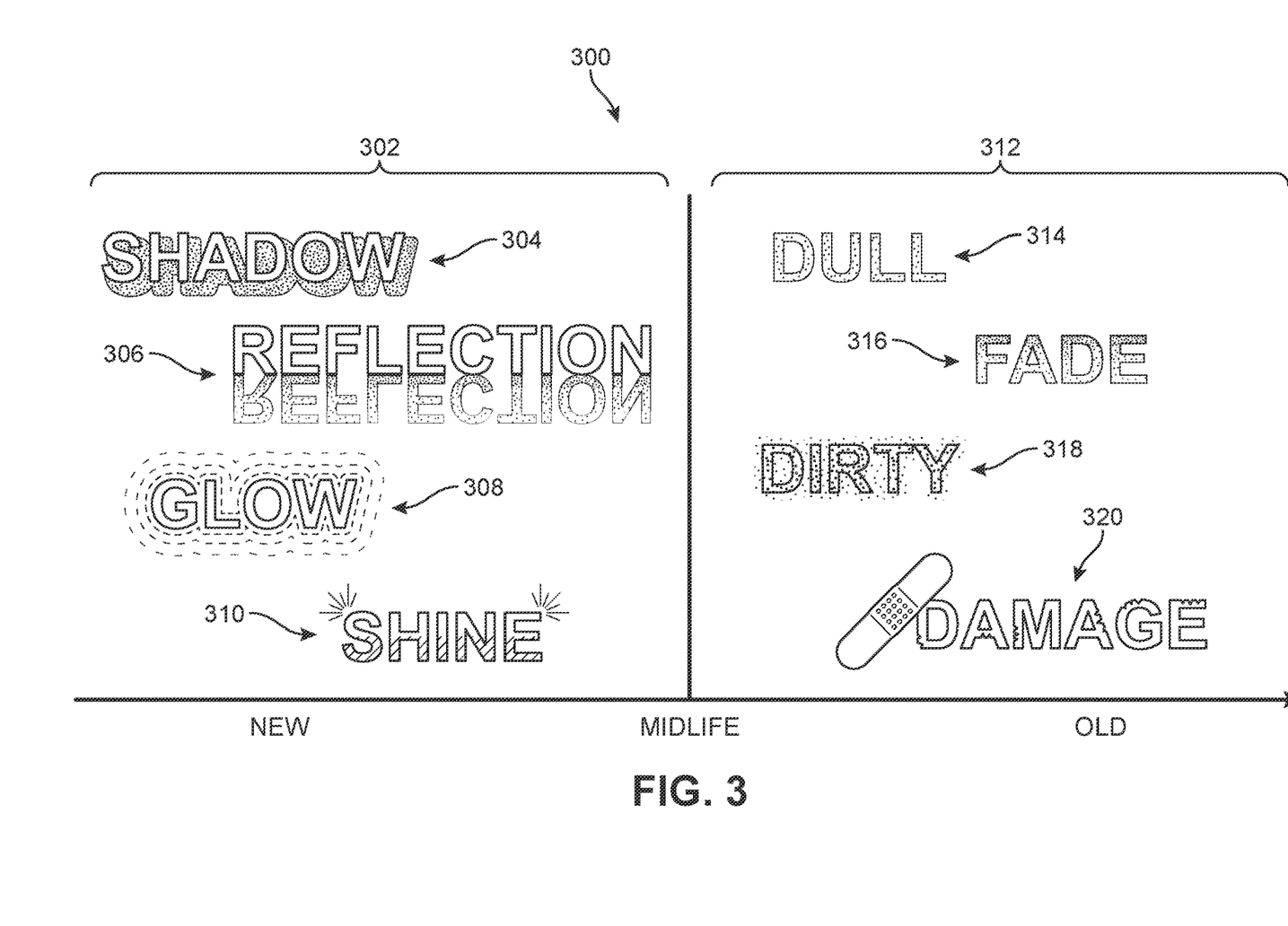
FIG. 3 is a schematic diagram of a plurality of different example embodiments of new effects and old effects that may be added to a base product image to visually represent the age or ownership duration of a product.

Referring now to FIG. 3, example embodiments of different temporal effects that may be added to a base product image to visually represent the age or ownership duration of a product are shown. In this embodiment, a plurality of temporal effects 300 include a plurality of new effects 302 that may be added to a base product image to visually represent newness of the product and a plurality of old effects 312 that may be added to a base product image to visually represent oldness of the product. In one embodiment, plurality of new effects 302 may include, for example, a shadow effect 304, a reflection effect 306, a glow effect 308, and/or a shine effect 310. Shadow effect 304 provides a highlight or depth to the base product image to make the image stand out compared with the base product image. Reflection effect 306 provides a partially transparent image "reflected" beneath the base product image. Glow effect 308 provides an aura or halo around the base product image. Shine effect 310 provides rays of light on portions of the base product image that mimic or emulate the shininess of new product.

In one embodiment, plurality of old effects 312 may include, for example, a dull effect 314, a fade effect 316, a dirty effect 318, and/or a damage effect 320. Dull effect 314 provides a dullness or a lack of shine (e.g., similar to a matte finish) to the base product image to make the image appear as if it has lost shine or color over time. Fade effect 316 provides a gradient loss of color or detail to portions of the base product image so that the image appears to be fading into the background. Dirty effect 318 covers portions or area of the base product image with a visual appearance of dirt and/or grime associated with old and used products. Damage effect 320 provides areas of the base product image that make the product appear to have suffered damage, such as dents, dings, cracks, etc. The examples of plurality of temporal effects 300, including the examples of new effects 302 and/or old effects 312, shown in FIG. 3 are representative of various types of effects that may be used to visually represent "newness" or "oldness" of a product by overlaying or adding these effects onto a base product image and are not meant to be a complete list. It should be understood that other temporal effects may also be used in accordance with the techniques described herein.

In some embodiments, the addition of new effects and/or old effects onto the base product image may be based on the age or ownership duration (for the purposes of this disclosure, "ownership duration" also refers to a rental or lease period, in addition to an ownership period) of the product and is based on the product lifecycle. In some embodiments, the product lifecycle may be determined in various ways. For example, in some cases, the product lifecycle may be based on an average ownership duration for that type of product or that specific model of product. In other cases, the product lifecycle may be based on the average ownership duration of products owned by a specific user or similar users. For example, one user may typically keep new automobiles for eight years or more, whereas another user may typically lease new automobiles for a short period of time, such as two or three years. In any case, the product lifecycle may be determined for each product that is owned by a user so that the appropriate temporal effects (e.g., new effects and/or old effects) may be overlaid or added to the base product image to change the visual appearance of the product image in the user interface to reflect its age or ownership duration relative to the determined product lifecycle.

In the example embodiments, plurality of temporal effects 300 are described as being overlaid or added onto a base product image (e.g., base product image 106). In other embodiments, plurality of temporal effects 300 may be shown in user interface 102 on user device 100 using other mechanisms. For example, one or more of plurality of temporal effects 300 may change the visual appearance of a user's product using a filter or mask, icons, labels, or other indicia. In some cases, a product may have multiple images, including images uploaded from the user, provided by the company through the app, or from other sources, that are associated with the product at different periods of time (e.g., new, midlife, old) in the product lifecycle. In this manner, plurality of temporal effects 300 (including new effects 302 and/or old effects 312) may be incorporated into the product image at each relevant period of time in order to visually change the appearance of the product shown in user interface 102 on user device 100 to reflect its age or ownership duration.

For example, an image of the product having one or more new effects (e.g., any of new effects 302) may be used to represent the new product when it is added by a user, a different image of the product without any temporal effects may be used when the product reaches its midlife point, and another, different image of the product having one or more old effects (e.g., any of old effects 312) may be used to represent the old product when its age or ownership duration extends past the midlife point. Other mechanisms may also be provided to change the visual appearance of the product image in the user interface to reflect its age or ownership duration, in accordance with the techniques described herein.

Figure 4:
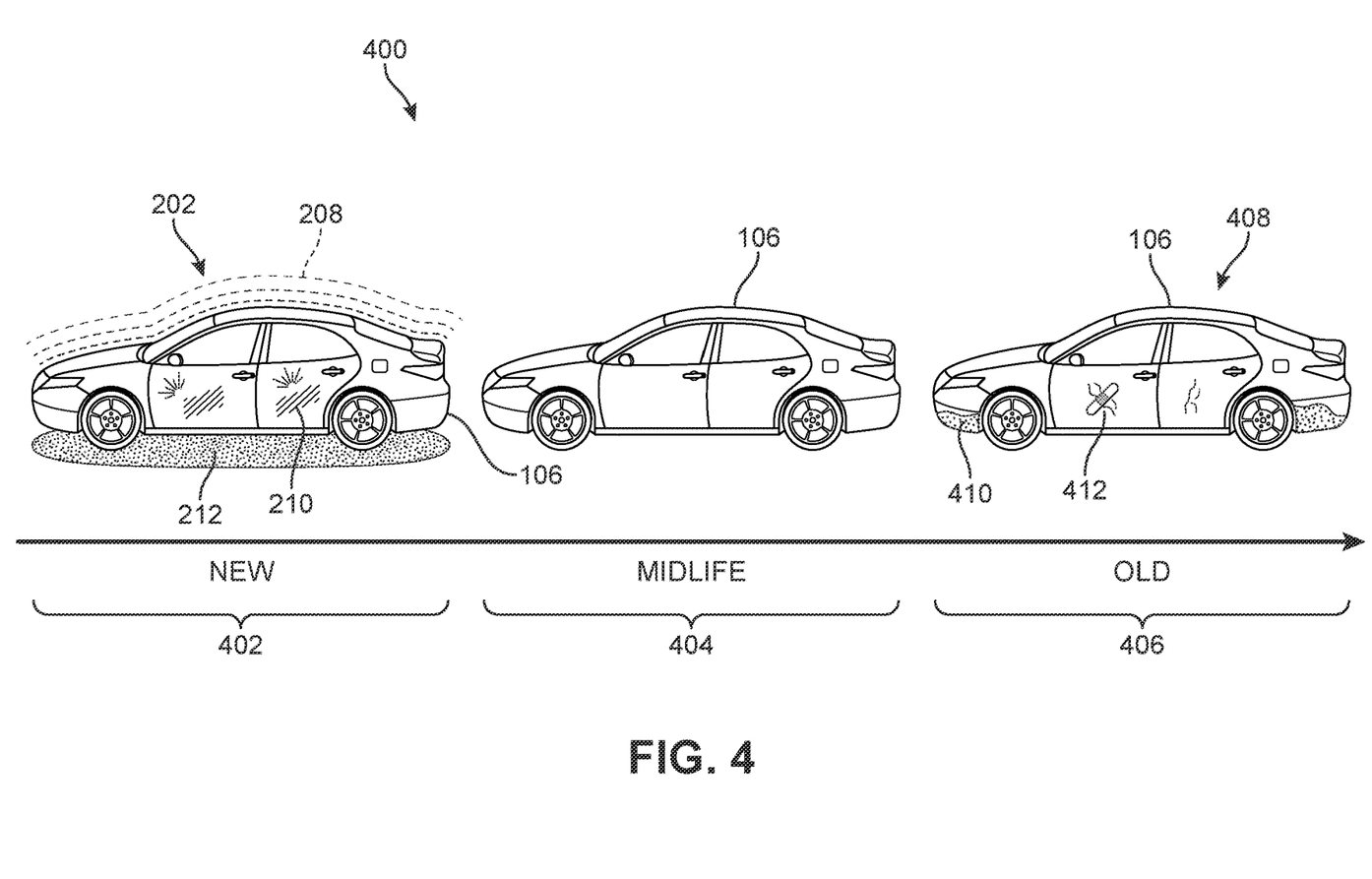
FIG. 4 is a schematic diagram of an example embodiment of new effects and old effects added and removed from a base product image based on a product lifecycle.

Referring now to FIG. 4, an example embodiment of new effects and old effects added and removed from a base product image based on a product lifecycle 400 is shown. In this embodiment, product lifecycle 400, as an example, is six years. As detailed above, this product lifecycle may be an average ownership duration for new automobiles. In other embodiments, product lifecycle 400 may be longer or shorter. For example, in the case of the user that keeps new automobiles for 8 years or more, the product lifecycle may be eight years, whereas the other user that leases new automobiles for two or three years, the product lifecycle may be two years.

According to the techniques described herein, at the beginning of product lifecycle 400 when new product 202 (e.g., the new automobile added by the user as described in FIG. 1) is first added to the user's account, base product image 106 of the automobile may have one or more new effects (e.g., selected from plurality of new effects 302, described above) overlaid or added to base product image 106 as viewed in user interface 102 on user device 100. For example, in this embodiment, base product image 106 (e.g., image of an automobile) has a number of new effects added or overlaid, including glow effect 208, shine effect 210, and shadow effect 212, onto base product image 106 that act to visually emphasize or highlight the appearance of newness of new product 202 in user interface 102.

Over the course of product lifecycle 400, as new product 202 becomes less new, the one or more new effects (e.g., glow 208, shine 210, and shadow 212) may be removed from base product image 106 until the product reaches its midlife point in product lifecycle 400. At the midlife point (e.g., in the example of a six year product lifecycle, the midlife point is three years of ownership by the user), no new effects are remaining so that only base product image 106 is used to represent the product. As time continues to go on in product lifecycle 400, the product eventually is visually represented in user interface 102 on user device 100 as an old product 408. Old product 408 has one or more old effects (e.g., selected from plurality of old effects 312, described above) that are overlaid or added to base product image 106 as viewed in user interface 102 on user device 100. For example, in this embodiment, base product image 106 (e.g., image of an automobile) has a number of old effects added or overlaid, including a dirty effect 410 and a damage effect 412, onto portions or areas of base product image 106 that act to visually emphasize or highlight the appearance of oldness or aging of old product 408 in user interface 102.

In an example embodiment, the rate at which the new effects are removed and the old effects are added to base product image 106 may be based on a regular, predetermined time period of ownership in relation to product lifecycle 400. For example, as described above, using as an example of six years for product lifecycle 400, a first time period 402 associated with the newness of the product may be defined as a three year period of time up to a midlife point 404 that is one half of product lifecycle 400 (e.g., three years of ownership for the example of six year product lifecycle 400) and a second time period 406 associated with the oldness of the product may be defined as a three year period of time after midlife point 404.

At the beginning of first time period 402, when new product 202 is first added, a predetermined number of new effects may be overlaid or added to base product image 106 so that when these new effects are removed on a regular, periodic basis, no new effects will be remaining on base product image 106 at midlife point 404. For example, in this embodiment, new product 202 has three new effects (e.g., glow effect 208, shine effect 210, and shadow effect 212) overlaid or added onto base product image 106. During first time period 402, one new effect of glow effect 208, shine effect 210, or shadow effect 212 may be removed approximately every eight months so that at three years of ownership (e.g., midlife point 404) no new effects remain and the product's visual appearance in user interface 102 on user device 100 is base product image 106 (i.e., with no overlaid or added temporal effects).

Starting from midlife point 404, as the product ownership duration increases and the product continues to age over the course of second time period 406, one or more old effects may be overlaid or added onto base product image 106 on a regular, periodic basis. With this arrangement, when the product reaches or nears the end of product lifecycle 400, it will be shown as old product 408 that includes several old effects (e.g., dirty effects 410 and damage effects 412) overlaid or added onto areas or portions of base product image 106 in user interface 102 on user device 100 to visually represent the age or duration of ownership of that product.

Figure 5:
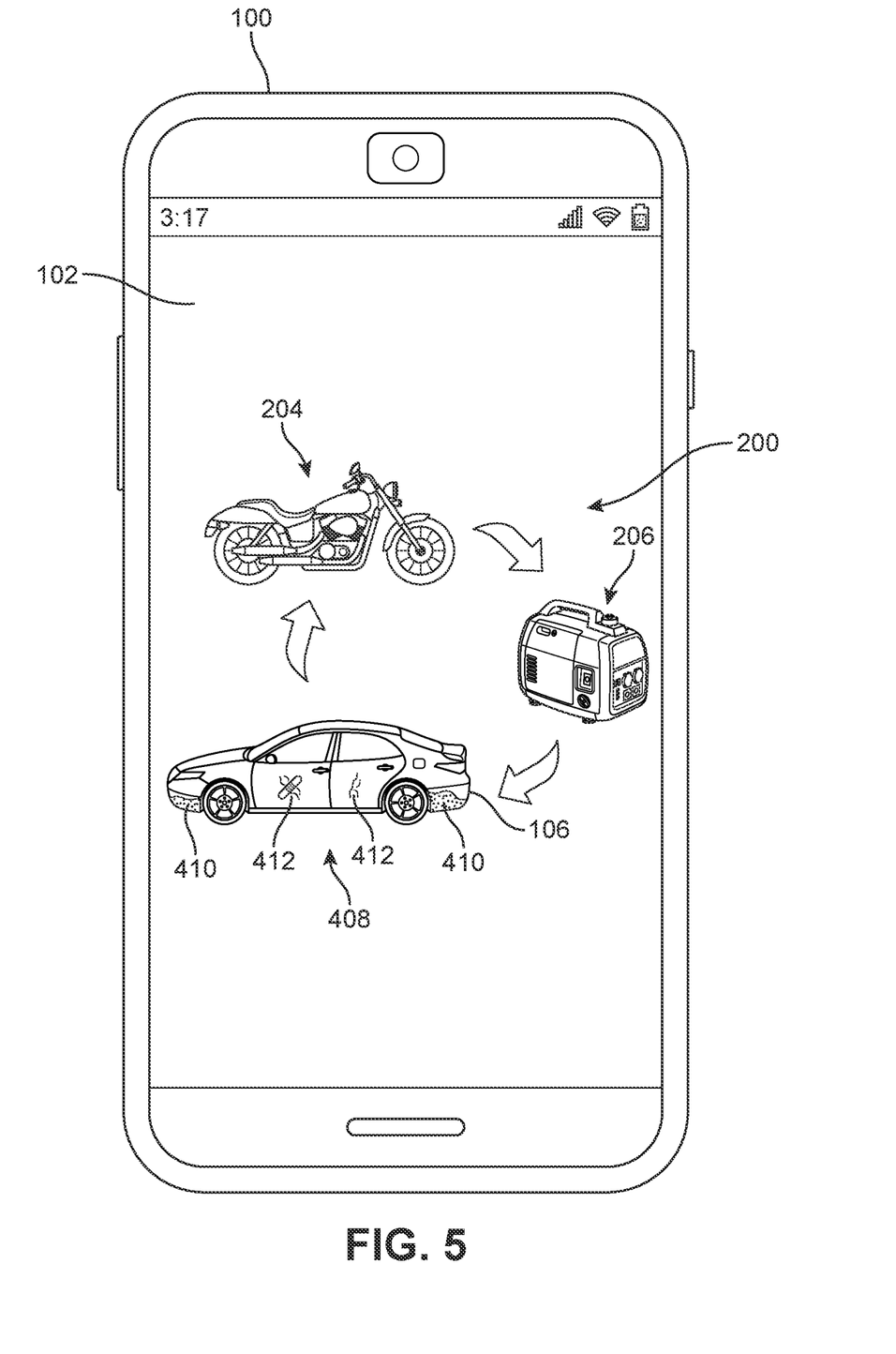
FIG. 5 is a representative view of an example embodiment of an old product visually represented on a user interface with one or more old effects added to a base product image.

For example, as shown in FIG. 5, user interface 102 on user device 100 is shown again with plurality of products 200 from the same company owned by the user. In this embodiment, old product 408 (e.g., the automobile owned by the user) is shown in user interface 102 on user device 100 along with second product 204 (e.g., a motorcycle) and third product 206 (e.g., a generator). As compared with FIG. 2, where the automobile was shown as new product 202 having new effects (e.g., glow effect 208, shine effect 210, and shadow effect 212) overlaid or added onto base product image 106, in this embodiment, the automobile is now shown as old product 408 having old effects (e.g., dirty effects 410 and damage effects 412) overlaid or added onto areas or portions of base product image 106 in user interface 102 on user device 100. By automatically reconfiguring the user interface based on a product lifecycle to change a visual appearance of a product image in the user interface in this manner, the user may quickly and easily visualize the duration or age of the products they own by accessing the unified product application through the user interface. Additionally, such visualization may also help encourage or motivate the user to purchase new products to replace or add to the products they currently own.

Figure 6:
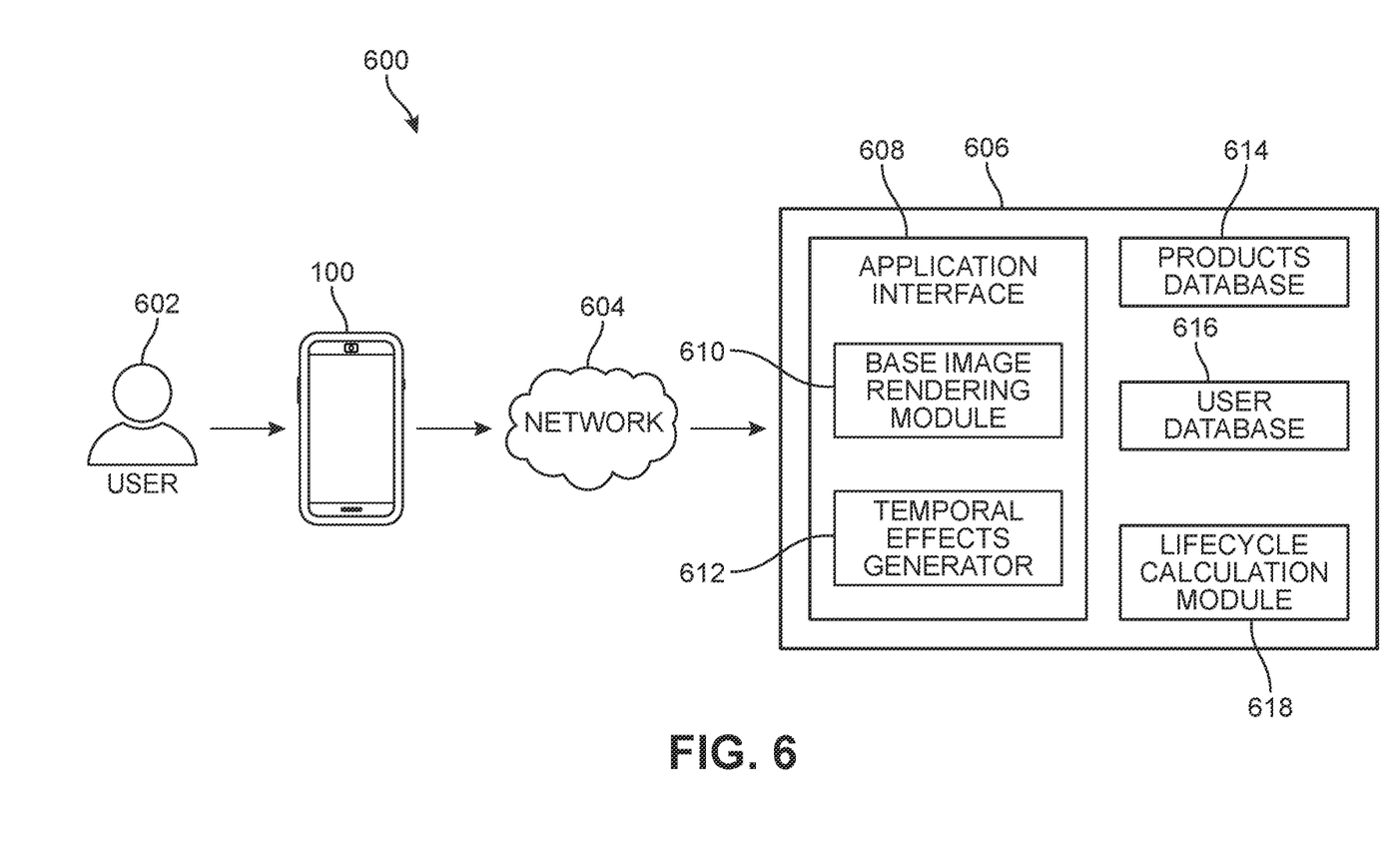
FIG. 6 is a block diagram of an example embodiment of a system for automatically reconfiguring the visual appearance of a product presented to a user on a user interface based on the product lifecycle.

Referring now to FIG. 6, a block diagram of an example embodiment of a system 600 for automatically reconfiguring the visual appearance of a product presented to a user on a user interface based on the product lifecycle is shown. In some embodiments, system 600 may be accessed by one or more users, including a representative user 602, through user device 100, described above. User device 100 communicates over a network 604 with a unified product application 606 offered by a company. For purposes of illustration, user 602 accesses application 606 via user interface 102 on user device 100 through network 604. Generally, network 604 may be any type of network, including, but not limited to Wi-Fi networks, cell phone networks, as well as any other type of network. Furthermore, network 604 may be associated with any type of network standard including, but not limited to CDMA, TDMA, GSM, AMPS, PCS, analog and/or W-CDMA.

Unified product application 606 is implemented by at least one or more processors of a computing device, such as a server or other computer. In some embodiments, application 606 may be hosted on a cloud-based server that may include a plurality of interconnected servers (not shown), including but not limited to web servers, data servers, database servers, domain controllers, backup servers, and the like. Application 606 may further include a plurality of modules that provide a plurality of functions. In some embodiments, application 606 may include an application interface module 608 which is configured to present graphical elements, including one or more product images (e.g., base product image 106) and plurality of temporal effects 300, for application 606. Application interface module 608 further includes a base image rendering module 610, which is configured to generate and present a base product image that visually represents the appearance of one or more products from the company. For example, in one embodiment, base image rendering module 610 may generate and present base product image 106 associated with the new automobile of the user, described above in reference to FIG. 1.

Application interface module 608 may also include a temporal effects generator module 612, which is configured to generate and overlay or add one or more temporal effects (e.g., plurality of temporal effects 300, including new effects 302 and/or old effects 312, described above) to the base product image generated by base image rendering module 610 to change a visual appearance of the product image in the user interface to reflect its age or ownership duration, in accordance with the techniques described above.

In an example embodiment, a products database 614 may store information associated with any of the various products offered for sale, lease, or rent by the company. For example, as described above, information about a variety of different products and/or types of products offered for sale, lease, or rent by the company may be stored in products database 614, including, but not limited to: automobiles (including cars, trucks, SUVs, vans, etc.), motorcycles, scooters, all-terrain vehicles, aircraft, watercraft, generators, and other types of vehicles, machines or machinery. Additionally, in some embodiments, information associated with each of the products stored in products database 614 may also be included, such as average product lifecycle, average ownership duration, product model information (including trims, options, accessories, wheels, colors, etc.), and other information associated with the company's products.

In one embodiment, if a user has not used application 606 previously, a profile and account creation user interface may be made available to the user. The account creation user interface may provide capability for the user to create a user account with a user ID and a password or other similar login credentials. The single account can then be used to access the full range of products offered for sale, lease, or rent by the company. A user database 616 may store the user profile for each user. For example, user database 616 may include an account for user 602, which among other data items, can include information about company products that have been purchased or are otherwise owned, rented, or leased by user 602 as a product inventory. In addition, in some embodiments, user database 616 may include a record of the past ownership activity of user 602, in order to determine or calculate a product lifecycle, age or ownership duration of the products owned by user 602, and to otherwise personalize the presentation of information and products on subsequent application access sessions. If user 602 makes purchases through application 606, these purchases can also be automatically added to the account associated with user 602 in user database 616.

In some embodiments, application 606 may also include a lifecycle calculation module 618. Lifecycle calculation module 618 is configured to determine a product lifecycle for each of the one or products associated with each user, including user 602. Lifecycle calculation module 618 may determine or calculate the product lifecycle in various ways. For example, as described above, in some cases, the product lifecycle may be based on an average ownership duration for that type of product or that specific model of product. In other cases, the product lifecycle may be based on the average ownership duration of products owned by a specific user or similar users. Lifecycle calculation module 618 determines the product lifecycle for each product that is owned by a user so that the appropriate temporal effects (e.g., new effects and/or old effects) may be overlaid or added to the base product image to change the visual appearance of the product image in the user interface to reflect its age or ownership duration relative to the determined product lifecycle. In some embodiments, lifecycle calculation module 618 may also determine the time periods at which new effects and/or old effects are to be added or removed from a base product image based on the age or ownership duration of the product.

FIG. 6 is shown for the purposes of illustrating one or more exemplary embodiments and not for purposes of limiting the same. The components of system 600, including application 606, as well as the components of other systems, hardware architectures, and software architectures discussed herein, may be combined, omitted, or organized into different architectures for various embodiments.

Figure 7:
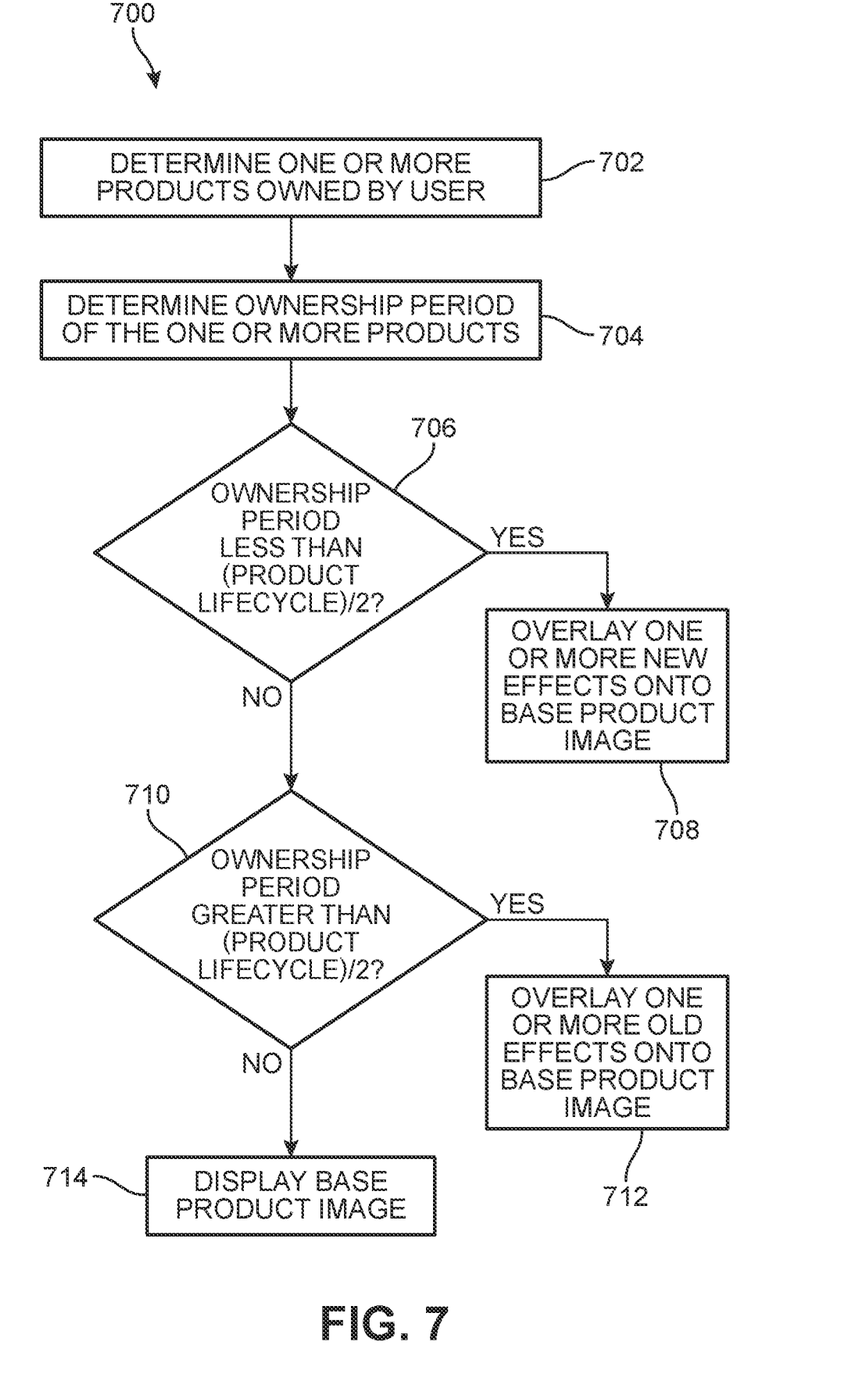
FIG. 7 is a flowchart of an example embodiment of a method for automatically reconfiguring the visual appearance of a product presented to a user on a user interface based on the product lifecycle.

FIG. 7 is a flowchart of an example embodiment of a method 700 for automatically reconfiguring the visual appearance of a product presented to a user on a user interface based on the product lifecycle. In some embodiments, method 700 may be implemented by at least one processor of a computing device using instructions stored on machine-readable media which, when executed by the processor, cause the processor to implement operations of method 700. For example, the processor may be associated with application 606 of system 600 and/or user device 100. In one embodiment, the processor implementing method 700 may be a processor of a server of system 600 hosting unified product application 606.

In an example embodiment, method 700 may begin at an operation 702. At operation 702, one or more products owned (including leased and/or rented products) by a user is determined. For example, at operation 702, application 606 may access user database 616 to obtain information associated with a user (e.g., user 602) to determine the products owned, leased, or rented by the user. Next, method 700 may proceed to an operation 704. At operation 704, an ownership period of the one or more products (determined at operation 702) is determined. The ownership period includes the length of time the product has been owned, leased, or rented by the user.

In some embodiments, method 700 includes operations configured to determine an age or ownership duration of the user's products relative to the product lifecycle for the purposes of determining whether to automatically reconfigure the user interface to change a visual appearance of the product image to reflect its age or ownership duration. These changes may include overlaying or adding one or more of plurality of temporal effects 300, including new effects 302 and/or old effects 312, shown in FIG. 3.

In this embodiment, after determining the ownership period for the user's products, method 700 proceeds to an operation 706, where the ownership period is compared to the product lifecycle. At operation 706, whether or not the ownership period (determined at operation 704) is less than one half of the product lifecycle (e.g., product lifecycle/2), which may also be referred to as the product midlife point (e.g., midlife point 404, described above), is determined. Upon determining that the result of the comparison at operation 706 is yes (i.e., the ownership period is less than half the product lifecycle), then method 700 proceeds to an operation 708. At operation 708, one or more new effects are overlaid or added to a base product image for the product. For example, when new product 202 is within new time period 402 (i.e., the ownership duration is less than midlife point 404), then one or more new effects, including glow effect 208, shine effect 210, and shadow effect 212, are overlaid or added onto base product image 106 that act to visually emphasize or highlight the appearance of newness of new product 202 in user interface 102.

Upon determining at operation 706 that the result of the comparison is no (i.e., the ownership period is not less than half the product lifecycle), then method 700 proceeds to an operation 710. At operation 710, whether or not the ownership period (determined at operation 704) is greater than one half of the product lifecycle (e.g., product lifecycle/2 or the midlife point) is determined. Upon determining that the result of the comparison at operation 710 is yes (i.e., the ownership period is greater than half the product lifecycle), then method 700 proceeds to an operation 712. At operation 712, one or more old effects are overlaid or added to a base product image for the product. For example, when old product 408 is within old time period 406 (i.e., the ownership duration is greater than midlife point 404), then one or more old effects, including dirty effects 410 and damage effects 412, are overlaid or added onto areas or portions of base product image 106 in user interface 102 on user device 100 to visually represent the age or duration of ownership of that product.

Upon determining at operation 710 that the result of the comparison is no (i.e., the ownership period is not greater than half the product lifecycle), then method 700 proceeds to an operation 714. That is, if the ownership period is both not less than half the product lifecycle (i.e., the result of operation 706) and not greater than half the product lifecycle (i.e., the result of operation 710), then the product is at its midlife point (e.g., midlife point 404) and, at operation 714, the base product image is displayed on the user interface on the user device without overlaying or adding any temporal effects.

Figure 8:
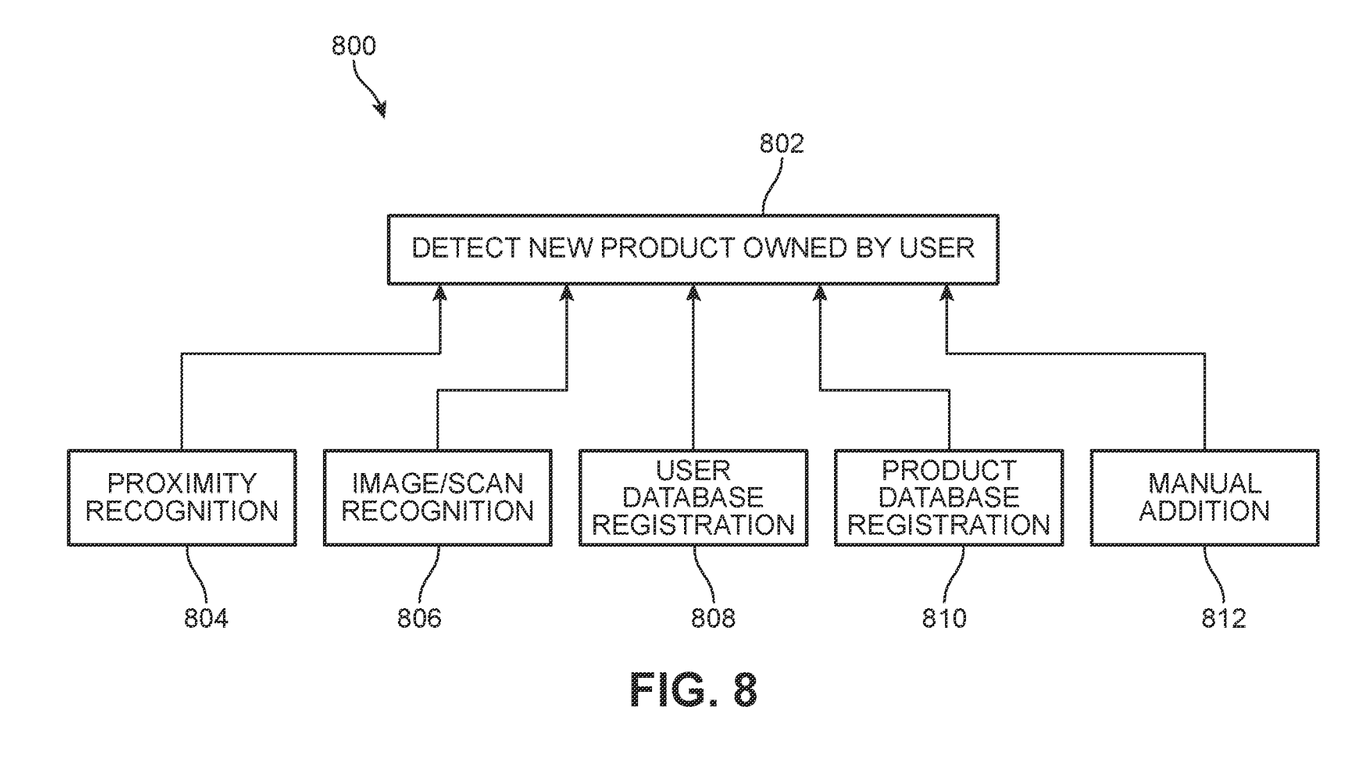
FIG. 8 is a schematic view of an example embodiment of a process or processes for detecting a new product owned by a user.

Referring now to FIG. 8, an example embodiment of a process 800 for detecting a new product owned by a user is shown. In some embodiments, process 800 may include any one or more processes or factors that may be used individually or in combination to detect a new product owned by a user 802. For example, in some cases, proximity recognition 804 may be used to detect a new product owned by a user 802. Proximity recognition 804 may include using wireless technology mechanisms associated with user device 100, such as Bluetooth, Near-Field Communication (NFC), or other similar technologies, to automatically recognize the presence of a new product in proximity to user device 100. In other cases, image or scan recognition 806 may be used to detect a new product owned by a user 802. Image or scan recognition 806 may include using a camera to take a photograph of the new product and using image recognition technologies to identify the product from the photograph or using a scanner (e.g., a bar code or Quick Response (QR) scanner) to scan identification on the product, such as bar codes, QR codes, a vehicle identification number (VIN), serial number, etc., to retrieve information about the product.

The process 800 to detect a new product owned by a user 802 may also include obtaining information from a user database registration 808 (e.g., when a user registers a new product with the company via user database 616), a product database registration 810 (e.g., when a product in product database 614 is assigned or associated with a user), and/or via a manual addition 812. It should be understood that the processes 800 identified in FIG. 8 to detect a new product owned by a user 802 are merely exemplary and other processes may be used.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A method of automatically reconfiguring a user interface based on a product lifecycle, the method comprising:

determining, by a processor of a unified product application, one or more products owned by a user;

determining, for each product of the one or more products owned by the user, an ownership period associated with an age or ownership duration of the product; comparing the ownership period to a product lifecycle for the product; and based on the comparison of the ownership period to the product lifecycle, overlaying one or more temporal effects onto a base product image for the product;

wherein the one or more temporal effects change a visual appearance of the base product image in a user interface on a user device in communication with the unified product application to reflect the age or ownership duration of the product.

2. The method according to claim 1, wherein the one or more temporal effects include at least one new effect configured to visually represent that the age or ownership duration of the product that is less than half of the product lifecycle.

3. The method according to claim 2, wherein the at least one new effect includes a glow effect, a shine effect, a shadow effect, or a reflection effect overlaid onto the base product image.

4. The method according to claim 1, wherein the one or more temporal effects include at least one old effect configured to visually represent that the age or ownership duration of the product that is greater than half of the product lifecycle.

5. The method according to claim 4, wherein the at least one old effect includes a dull effect, a fade effect, a dirty effect, or a damage effect overlaid onto the base product image.

6. The method according to claim 1, wherein comparing the ownership period to the product lifecycle includes determining the product lifecycle based on an average ownership duration of the product.

7. The method according to claim 1, wherein comparing the ownership period to the product lifecycle includes determining the product lifecycle based on an average ownership duration of products owned by the user.

8. The method according to claim 1, wherein the one or more temporal effects are added or removed from the base product image on a regular, predetermined time period of ownership in relation to the product lifecycle.

9. A system for automatically reconfiguring a user interface based on a product lifecycle, the system comprising a processor and machine-readable media including instructions which, when executed by the processor, cause the processor to:

determine one or more products owned by a user;

determine, for each product of the one or more products owned by the user, an ownership period associated with an age or ownership duration of the product; compare the ownership period to a product lifecycle for the product; and based on the comparison of the ownership period to the product lifecycle, overlay one or more temporal effects onto a base product image for the product in the user interface;

wherein the one or more temporal effects change a visual appearance of the base product image in the user interface on a user device to reflect the age or ownership duration of the product.

10. The system according to claim 9, wherein the one or more temporal effects include at least one new effect configured to visually represent that the age or ownership duration of the product that is less than half of the product lifecycle.

11. The system according to claim 10, wherein the at least one new effect includes a glow effect, a shine effect, a shadow effect, or a reflection effect overlaid onto the base product image.

12. The system according to claim 9, wherein the one or more temporal effects include at least one old effect configured to visually represent that the age or ownership duration of the product that is greater than half of the product lifecycle.

13. The system according to claim 12, wherein the at least one old effect includes a dull effect, a fade effect, a dirty effect, or a damage effect overlaid onto the base product image.

* * * * *